Oct. 10, 1967  E. J. LYONS  3,346,039
MOLD HEATER
Filed July 16, 1965

INVENTOR
EDWARD J. LYONS
BY Charles A. Warren
ATTORNEY

3,346,039
MOLD HEATER

Edward J. Lyons, Wapping, Conn., assignor to United Aircraft Corporation, East Hartford, Conn., a corporation of Delaware
Filed July 16, 1965, Ser. No. 472,552
5 Claims. (Cl. 164—338)

ABSTRACT OF THE DISCLOSURE

A heater for a shell mold, the latter having an open end resting on a chill plate, the heater being made up of a plurality of rings stacked one above the other and surrounding the mold with a separate heating element located in each of the rings and with the inner surface of the ring spaced slightly from the mold in order to permit granular refractory material to be positioned therebetween.

---

This invention relates to a mold heater for use in heating shell-type molds during pouring and solidification of the metal within the mold.

In obtaining controlled solidification of a metal within a shell mold it is essential to control the extent to which the mold is heated and its rate of cooling in different areas. One feature of the invention is a heater for enclosing the mold made up of a series of ring-shaped heating elements arranged to be placed in end-to-end relation for heat with each element individually controlled. Another feature is the arrangement of these rings to form an enclosure slightly greater in diameter than the mold and substantially the length of the mold to closely surround the mold.

As a further control of the rate of heating and cooling another feature is the positioning of the mold within the heater ring and the filling of the space therebetween with a refractory granular material for more satisfactory control of the heating and cooling.

Other features and advantages will be apparent from the specification and claims, and from the accompanying drawing which illustrates an embodiment of the invention.

Figure 1:
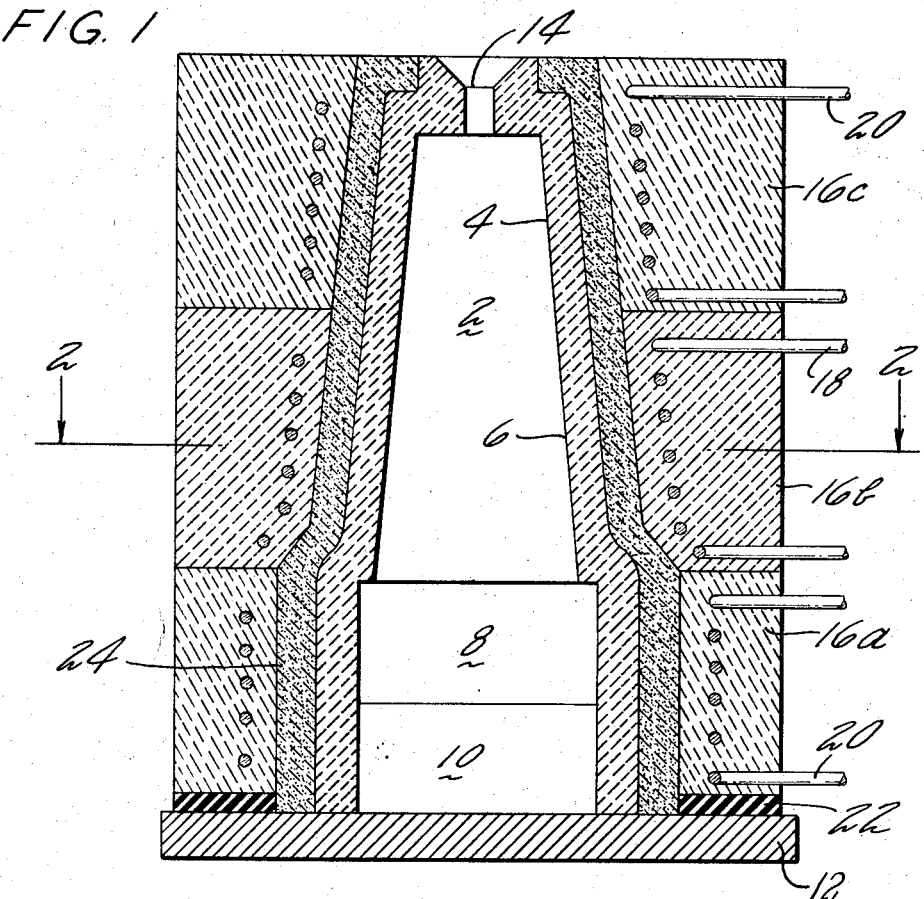
FIG. 1 is a vertical sectional view through the device.

The invention is shown for use in making a turbine blade 2 in a shell mold 4, the latter having the central opening 6 to form the airfoil portion of the blade, a connecting opening 8 for the root portion, and a bottom opening 10 for a growth area, later described. The mold rests on and is open onto a chill plate 12, the latter used in producing directionally solidified cast articles when so desired. The mold has a top end with a pouring spout 14 by which the mold is filled with molten metal.

For heating the mold the latter is surrounded by a plurality of stacked rings 16 or heater elements the inner surfaces of which correspond in shape substantially to the contours of the mold. Thus as shown, the bottom ring 16a has relatively straight sides to correspond to the root and growth areas of the mold, and the middle ring and top rings 16b and 16c have converging inner surfaces to extend substantially in parallel relation to the outer walls of the airfoil portion of the mold.

Each ring of the stack has a heating coil 18 embedded therein and each coil substantially parallels the inner surface of the corresponding ring as shown. Suitable terminals 20 are provided for connection of each coil through suitable control switches to a source of electric power. The several rings have parallel flat top and bottom surfaces for stacking directly one above another and the bottom ring rests on an insulating ring 22 at the periphery of the chill plate.

These rings 16 are made up preferably of a castable refractory ceramic such as an alumina base material which is compatible with the material of the embedded heating element, this being preferably a coiled molybdenum wire. The rings are thus spall resistant, thermally stable and refractory for effectively heating and controlling the temperature of the mold, and may also provide an oxidation resistant barrier for the wire. Obviously, suitable thermostatic connections may be supplied if desired.

To assist in heat transfer to the mold, the space within the stack of rings and around the shell mold is filled with refractory granular material 24 serving to fill this space, and provide a measure of support for the mold. This material is selected to retain its granular consistency even when the mold is heated to a temperature above that of the alloy being cast so that the stacked rings may be removed intact after the casting operation is completed. One type of a refractory for this purpose is granular aluminum oxide.

Figure 2:
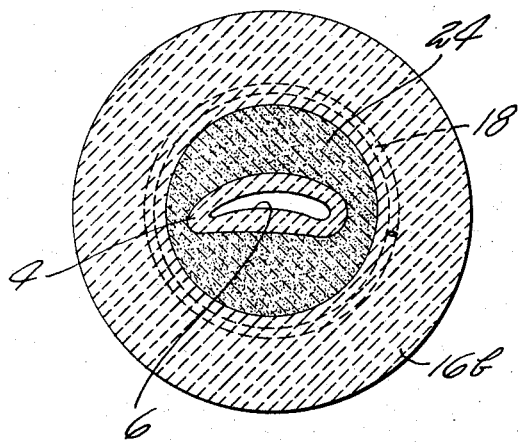
FIG. 2 is a transverse sectional view on line 2—2 of FIG. 1.
Figure 3:
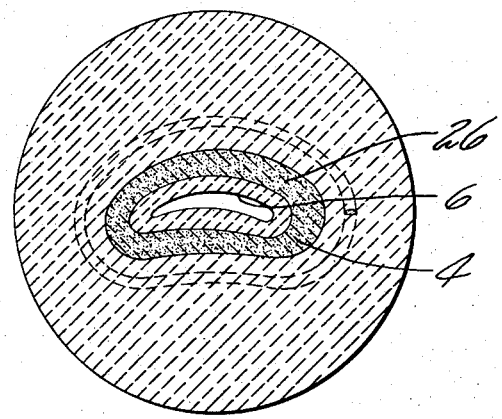
FIG. 3 is a transverse sectional view of a modified arrangement.

The inner surfaces of the heater rings may be annular as shown in FIG. 2, or in certain instances as in FIG. 3 the inner surfaces 26 may conform more precisely to the cross-sectional shape of the shell mold where temperatures are particularly critical.

In operation, the device may be used strictly for providing a heated mold. However, the device is particularly useful in directional solidification as described in the co-pending VerSnyder application Ser. No. 361,323, filed Apr. 17, 1964, now issued as Patent No. 3,260,505, and assigned to the same assignee as this invention. In this event, electrical energy is applied to the coils until the mold is heated substantially above the melting point of the alloy and the chill plate is kept cool to a temperature adjacent that of the boiling point of water. When the metal is poured into the mold the chill plate causes immediate crystallization on its surface and the crystals grow vertically within the mold as the chill plate removes heat from the melted alloy. As solidification continues upwardly, successive heating coils are turned off, beginning with the coil in the bottom ring to reduce successively the heat input from the several rings during the solidification.

It is to be understood that the invention is not limited to the specific embodiment herein illustrated and described but may be used in other ways without departure from its spirit as defined by the following claims.

I claim:

1. A heater for a unitary shell-type mold, the latter having a length substantially greater than its transverse dimension, said heater including a plurality of rings of ceramic material in end-to-end engagement with one another, the cooperating faces of adjacent rings abutting one another, and together forming a cavity for the mold with the assemblage of rings surrounding and spaced from the mold and with the longitudinal dimension of the mold substantially parallel to the axis of the rings, each ring having its inner periphery closely spaced from the periphery of the mold in the area surrounded by the ring to provide a space for granular material therein, and each ring having at least one heating coil embedded therein adjacent to the inner periphery of the ring, each heating coil having individual connections accessible at the outer periphery of the ring in which it is embedded and a chill plate at the bottom of the plurality of rings on which the rings are stacked and on which the mold within the stack is supported.

2. A heater as in claim 1 in which the inner peripheries of the rings form an inner wall spaced approximately uniformly from the mold.

3. A heater as in claim 1 in which the total length of the several rings is substantially the same as the length of the mold.

4. A heater as in claim 1 in which the mold has a pouring mouth at one end, and the end ring terminates at a point close to the mouth when the mold is positioned within the ring assemblage.

5. A heater as in claim 1 in which the mold is positioned within the ring assemblage by refractory granular material in the space between the mold and the inner peripheries of the rings.

References Cited

UNITED STATES PATENTS

| | | | |
|---|---|---|---|
| 1,251,951 | 1/1918 | Ashdown | 164—126 |
| 1,378,189 | 5/1921 | Northrup. | |
| 2,440,087 | 4/1948 | Green | 164—338 X |
| 2,540,242 | 2/1951 | Brennan | 164—284 |

FOREIGN PATENTS 503,512     1951     Belgium.

J. SPENCER OVERHOLSER, *Primary Examiner.*

E. MAR, *Assistant Examiner.*